United States Patent
Ferrari et al.

(10) Patent No.: US 9,982,075 B2
(45) Date of Patent: May 29, 2018

(54) HIGHLY UNSATURATED MULTI-MODAL POLYISOOLEFIN COMPOSITION AND PROCESS FOR PREPARATION THEREOF

(71) Applicant: ARLANXEO Singapore Pte. Ltd., Singapore (SG)

(72) Inventors: Lorenzo Ferrari; Sarah Chadder, Cambridge (CA); Patrick Crewdson, London (CA)

(73) Assignee: ARLANXEO Singapore Pte. Ltd., Singapore (SG)

( * ) Notice: Subject to any disclaimer, the term of this patent is extended or adjusted under 35 U.S.C. 154(b) by 0 days. days.

(21) Appl. No.: 15/307,065

(22) PCT Filed: Apr. 28, 2015

(86) PCT No.: PCT/CA2015/050351
§ 371 (c)(1),
(2) Date: Oct. 27, 2016

(87) PCT Pub. No.: WO2015/164962
PCT Pub. Date: Nov. 5, 2015

(65) Prior Publication Data
US 2017/0051088 A1  Feb. 23, 2017

(30) Foreign Application Priority Data
Apr. 30, 2014  (EP) ................................ 14166575

(51) Int. Cl.
| | |
|---|---|
| C08L 9/00 | (2006.01) |
| C08F 210/12 | (2006.01) |
| C08L 23/22 | (2006.01) |
| C08F 210/10 | (2006.01) |

(52) U.S. Cl.
CPC .......... *C08F 210/12* (2013.01); *C08F 210/10* (2013.01); *C08L 23/22* (2013.01); *C08L 2205/025* (2013.01)

(58) Field of Classification Search
CPC ............................ C08F 210/12; C08L 23/22
USPC ..................................................... 524/856
See application file for complete search history.

(56) References Cited

U.S. PATENT DOCUMENTS

| | | | |
|---|---|---|---|
| 3,928,297 A | 12/1975 | Thaler et al. | |
| 5,071,913 A | 12/1991 | Powers et al. | |
| 6,403,747 B2 | 6/2002 | Gronowski | |
| 7,446,151 B2 | 11/2008 | Resendes et al. | |
| 2002/0115766 A1 | 8/2002 | Langstein et al. | |
| 2009/0018289 A1* | 1/2009 | Resendes ............. | C08F 210/12 526/90 |

FOREIGN PATENT DOCUMENTS

| | | |
|---|---|---|
| CA | 1019095 A | 10/1977 |
| CA | 2527273 A | 5/2007 |

OTHER PUBLICATIONS

Morton, Maurice, Butyl and Halobutyl Rubbers, Rubber Technology, Third Edition, Van Nostrand Reinhold Company, 1987, pp. 297-300.
Encyclopedia of Polymer Science and Engineering, vol. 17, Transitions and Relaxations to Zwitterionic Polymerization, John Wiley & Sons, Vulcanization, date unavailable, pp. 666-698.
Rubenstein, Michael, et al., Polymer Physics, Oxford University Press, 2003, pp. 288-290, Abstract.
Trinkle, Stefan, et al. "Van Gurp-Palmen Plot II—classification of long chain branched polymers by their topology", Rheol Acta (2002)41: 103-113, Springer-Verlag, Abstract.
Trinkle, Stefan, et al. "Van Gurp-Palmen Plot:a way to characterize polydispersity of linear polymers", Rheol Acta (2001) 40: 322-328, Springer-Verlag, Abstract.
Thaler, W.A. et al., "High-Molecular-Weight, High-Unsaturation Copolymers of Isobutylene and Conjugated Dienes. I. Synthesis", Rubber Chemistry and Technology, vol. 49, Issue 4, Sep. 1976, Abstract.
Partial European Search Report from European Application No. 14166575, dated Oct. 21, 2014, three pages.
International Search Report from International Application No. PCT/CA2015/050351, dated Jul. 22, 2015, two pages.

* cited by examiner

*Primary Examiner* — Hui H Chin

(57) ABSTRACT

A polyisoolefin-based polymer composition having a multimodal molecular weight distribution and a level of unsaturation of greater than about 4 mol % is described, which can be prepared by co-polymerizing 70-96 vol % isoolefin monomer and 30-4 vol % β-pinene or multi-olefin monomer, based on volume of isoolefin monomer and β-pinene or multi-olefin monomer, in a solution comprising 0-30 vol % aliphatic hydrocarbon diluent, based on volume of the solution, and an alkylaluminum halide initiator system. The polyisoolefin-based polymer composition has a multimodal molecular weight distribution having a first molecular weight fraction having a peak molecular weight (Mp) of less than about 300 kg/mol, and a second molecular weight fraction having a peak molecular weight (Mp) of greater than about 1000 kg/mol or at least 3 times greater than the Mp of the first molecular weight fraction.

17 Claims, 6 Drawing Sheets ent invention relates to polyisoolefin composi-
HIGHLY UNSATURATED MULTI-MODAL POLYISOOLEFIN COMPOSITION AND PROCESS FOR PREPARATION THEREOF

TECHNICAL FIELD

The present invention relates to polyisoolefin compositions having a multimodal molecular weight distribution, especially butyl rubber compositions with high isoprene content, and processes for production thereof.

BACKGROUND

Polyisoolefins can be provided as homopolymers or copolymers comprising an isoolefin and a copolymerizable monomer. Butyl rubber is a copolymer of an isoolefin and one or more multi-olefin co-monomers which are usually conjugated dienes. Commercial butyl rubber comprises primarily isobutylene and contains no more than 2.5 mol % of isoprene as the multi-olefin. Butyl rubber is generally prepared using a slurry process in methyl chloride and uses $AlCl_3$ as an initiator. The polymerization is typically carried out at temperatures of −90° C. to −100° C. These low temperatures are required in order to maintain suitably high molecular weights for rubber applications. Raising the temperature or increasing the amount of isoprene above 2.5 mol % results in the formation of a low molecular weight polymer which is no longer suitable for molded article applications.

There are very few techniques known which allow for the incorporation of more than 2.5 mol % of isoprene in butyl rubber. The molecular weight depressing effect of diene comonomers may, in principle, be offset by still lower reaction temperatures. However, in this case secondary reactions that result in gelation tend to occur to a greater extent and such low temperature processes are more costly. Gelation at reaction temperatures of around −120° C. and possible options for the reduction thereof have been described (c.f. W. A. Thaler, D. J. Buckley Sr., Meeting of the Rubber Division, ACS, Cleveland, Ohio, May 6-9, 1975, published in Rubber Chemistry & Technology 49, 960-966 (1976)).

Another technique for the production of >2.5 mol % isoprene involves the incorporation of a second co-monomer which is capable of cross-linking the growing polymer. This technique was used in, for example, Canadian Patent 2 418 884 wherein they used the cross-linking molecule di-vinyl-benzene (DVB) to achieve a polymer with >2.5 mol % isoprene and suitably high molecular weights. The use of di-vinylbenzene is problematic as its use in industrial processes is tightly controlled, requiring new techniques for the production of >2.5 mol % butyl rubber.

A substantially gel free polyisoolefin rubber, a butyl copolymer rubber in particular, with a high molecular weight fraction can be made in a "star-branched" configuration. The material is synthesized by the direct copolymerization with a functional reagent (for example, a multifunctional resin) to produce a material with a high MW fraction that is branched. An example of such a rubber is described by Powers et al (U.S. Pat. No. 507,113). The star-branched product produced by this process typically has an average molecular weight of less than 250 g/mol. Powers mentions the prior art related to DVB-modified butyl rubber and characterizes the prior art as deficient, since it relates to polymers having a high gel content in the polymer product. The use of functional reagents to cause branching is unde-sirable in that it increases the cost and complexity of the polymerization process, and may lead to fouling of the various pipes and reactors.

Canadian patent 1,019,095 [Scherbakova et al. (Scherbakova)] teaches an industrial process for manufacturing butyl rubber in solution. The catalyst system used in the process comprises an alkylaluminum halide (e.g., ethylaluminum sesquichloride (($C_2H_5$)$_2$AlCl—$Cl_2$Al$C_2H_5$)), with water or hydrogen sulfide as a co-catalyst, and isopentane as a solvent. The process, most probably takes place at −85° C. to −80° C., with a content of solids in solution at about 10 weight percent. The low solids content makes this process less economic than conventional processes.

There is therefore a need for a polyisoolefin copolymer rubber that has greater than 2.5 mol % multiolefin comonomer has commercially relevant molecular weight characteristics, low gel content, superior dimensional stability, improved processability, low content of environmentally undesirable reagents (such as DVB), is produced at temperatures higher than or equal to those used in current processes and/or is produced at higher solids content for equivalent or improved economics.

SUMMARY OF THE INVENTION

In accordance with one aspect of the present invention, there is provided a polyisoolefin-based copolymer composition comprising a multimodal molecular weight distribution comprising a first molecular weight fraction having a peak molecular weight ($M_p$) of less than about 300 kg/mol and a second molecular weight fraction having a peak molecular weight ($M_p$) at least 3 times greater than the $M_p$ of the first molecular weight fraction, the copolymer composition having a level of unsaturation of greater than about 4 mol %.

In accordance with another aspect of the present invention, there is provided a process for producing a polyisoolefin-based copolymer composition, the process comprising: co-polymerizing 70-96 vol % isoolefin monomer and 30-4 vol % β-pinene or multi-olefin monomer, based on volume of isoolefin monomer and β-pinene or multi-olefin monomer, in a solution comprising 0-30 vol % aliphatic hydrocarbon diluent, based on volume of the solution, and an alkylaluminum halide initiator system to produce a polyisoolefin-based copolymer composition having a multimodal molecular weight distribution comprising a first molecular weight fraction having a peak molecular weight ($M_p$) of less than about 300 kg/mol and a second molecular weight fraction having a peak molecular weight ($M_p$) at least 3 times greater than the $M_p$ of the first molecular weight fraction, the copolymer composition having a level of unsaturation of greater than about 4 mol %.

In accordance with another aspect of the present invention, there is provided a polyisoolefin-based copolymer composition comprising a multimodal molecular weight distribution comprising a first molecular weight fraction having a peak molecular weight ($M_p$) of less than about 300 kg/mol and a second molecular weight fraction having a peak molecular weight ($M_p$) of greater than about 1000 kg/mol, the copolymer composition having a bulk weight average molecular weight ($M_w$) greater than about 250 kg/mol and a level of unsaturation of greater than about 4 mol %.

In accordance with another aspect of the present invention, there is provided a process for producing a polyisoolefin-based copolymer composition, the process comprising: co-polymerizing 70-96 vol % isoolefin monomer and 30-4 vol % β-pinene or multi-olefin monomer, based on volume of isoolefin monomer and β-pinene or multi-olefin monomer, in a solution comprising 0-30 vol % aliphatic hydrocarbon diluent, based on volume of the solution, and an alkylaluminum halide initiator system to produce a polyisoolefin-based copolymer composition having a multimodal molecular weight distribution comprising a first molecular weight fraction having a peak molecular weight ($M_p$) of less than about 300 kg/mol and a second molecular weight fraction having a peak molecular weight ($M_p$) of greater than about 1000 kg/mol, the copolymer composition having a bulk weight average molecular weight ($M_w$) greater than about 250 kg/mol and a level of unsaturation of greater than about 4 mol %.

In accordance with another aspect of the present invention, there is provided a cured article comprising a polyisoolefin-based copolymer composition of the present invention.

The present invention advantageously provides a polyisoolefin-based copolymer composition with a high degree of unsaturation (e.g. high isoprene levels) and a high enough molecular weight without the use of a cross-linking or branching agent to be processable while maintaining physical characteristics and dimensional stability of cured articles made from the polyisoolefin-based copolymer composition. The polyisoolefin-based copolymer composition has improved processability, good physical properties (e.g. lower Mooney Viscosity), faster cure times, need for less curatives and excellent impermeability. The present invention describes polyisoolefin-based copolymer compositions with a multimodal molecular weight distribution resulting from specific reaction conditions, and not due to the addition of a multifunctional branching reagent.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION

Figure 1:
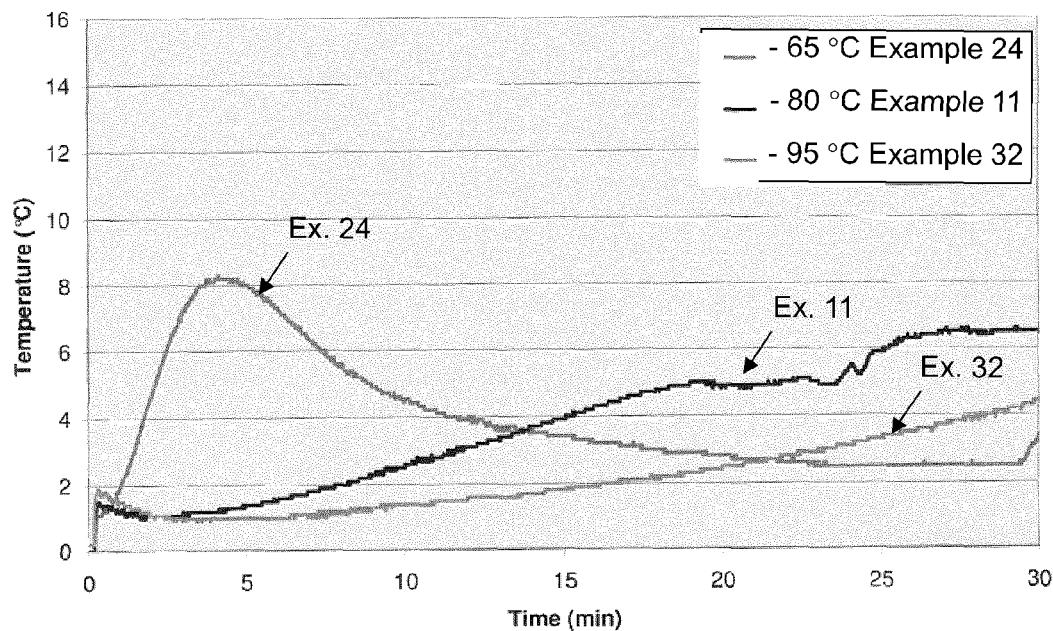
FIG. 1 depicts a graph showing ΔT reaction profiles at copolymerization reactions performed at various reaction temperatures, where the temperature profile peaks at about 5 minutes for −65° C. (Example 24), or is a continually rising profile for polymerization at −80° C. (Example 11) or is a lower but continually rising profile at −95° C. (Example 32)

The present invention is not limited to a special polyisoolefin. However, polyisoolefins produced from isoolefin monomers having from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (also called isobutylene).

The polyisoolefin-based composition may comprise a homopolymer or a copolymer of at least one isoolefin monomer and at least one comonomer copolymerizable with the isoolefin monomer. The comonomer selected preferably provides unsaturation in the copolymer. Suitable comonomers include multiolefin monomers, such as diene monomers, particularly conjugated diene monomers.

In one embodiment, the polyisoolefin-based copolymer is a butyl rubber copolymer. Butyl rubbers are formed by the copolymerization of at least one isoolefin monomer and β-pinene or at least one multiolefin monomer. Every multi-olefin copolymerizable with the isoolefin known by the skilled in the art can be used. However, multiolefin monomers having from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, may be used. Isoprene is more preferable.

The level of unsaturation in the copolymer arises from the amount of the monomer that provides unsaturation (e.g. β-pinene or at least one multiolefin) present in the copolymer. The level of unsaturation in the copolymer is greater than about 2.5 mol %, greater than about 3 mol %, greater than about 3.5 mol %, greater than about 4 mol %, greater than about 4.5 mol %, greater than about 5.5 mol %, greater than about 7 mol %, or 4-30 mol %, or 5.5-30 mol %, or 4-12 mol %, or 5.5-12 mol %, or 4-8 mol %, or 5.5-8 mol %.

The polyisoolefin-based copolymer may optionally comprise further copolymerizable monomers, preferably cationically polymerizable monomers. As optional further monomers, any monomer copolymerizable with the isoolefins and/or dienes known by the skilled in the art can be used. Indene, styrene derivatives or mixtures thereof may be used as optional monomers. α-Methyl styrene, p-methyl styrene, chlorostyrene or mixtures thereof are preferably used. p-Methyl styrene is more preferably used.

The polyisoolefin-based copolymer may comprise about 0-75 wt %, or about 0.1-75 wt %, or about 1-50 wt %, or about 2-25 wt % or about 3-15 wt % of the second molecular weight fraction, based on total weight of the copolymer. The polyisoolefin-based copolymer preferably comprises less of the second molecular weight fraction than the first molecular weight fraction. The bulk weight average molecular weight ($M_w$) may be controlled to greater than about 250 kg/mol, or greater than about 350 kg/mol, or greater than about 400 kg/mol, or greater than about 500 kg/mol.

In one embodiment, the polyisoolefin-based copolymer is compositionally homogeneous throughout the molecular weight distribution. As used herein, the term "compositionally homogeneous" refers to a copolymer having a uniform molecular weight distribution, for example comprising random short chains and random long chains of one or more isoolefin monomers and one or more multiolefin monomers. Optionally, the high MW fraction of the copolymer may have a low polydispersity index (PDI), for example a PDI in the range of about 1-2.5, 1.25-2.25, 1.5-2.5 or 1.75 to 2.25.

The copolymer may comprise inter-chain branching without the use of an additional cross-linking agent. Thus, the copolymer composition may be free of multiolefin cross-linking agents such as divinylbenzene (DVB), diisopropylbenzene, divinyltoluene, divinylxylene, 1,3,5-hexatriene, 2-isopropenylnorbornene, 2-vinyltoluene, or C1 to C20 alkyl-substituted derivatives thereof. The copolymer composition may be free of branching reagents, for example multifunctional resins, such as high vinyl styrene-butadiene copolymers or high vinyl butadiene copolymers or mixtures thereof.

The polyisoolefin-based copolymer can be subjected to a halogenation process in order to produce a halogenated copolymer. When the polyisoolefin-based copolymer comprises a butyl polymer, the resulting halogenated copolymer is a halobutyl polymer. Bromination or chlorination can be performed according to the process known by those skilled in the art. During halogenation, some or all of the multiolefin content of, for example, the butyl polymer is converted to allylic halides. The allylic halides in the halobutyl polymer are therefore repeating units derived from the multiolefin monomers originally present in the butyl polymer. The total allylic halide content of the halobutyl polymer cannot exceed the starting multiolefin content of the parent butyl polymer.

Halogenation agents useful for halogenating butyl rubber may comprise elemental chlorine ($Cl_2$) or bromine ($Br_2$) and/or organo-halide precursors thereto, for example dibromo-dimethyl hydantoin, tri-chloro isocyanuric acid (TCIA), n-bromosuccinimide, or the like. Preferably, the halogenation agent comprises or is bromine. The amount of halogenation during this procedure may be controlled so that the final polymer has the preferred amounts of halogen described hereinabove. The specific mode of attaching the halogen to the polymer is not particularly restricted and those of skill in the art will recognize that modes other than those described above may be used while achieving the benefits of the invention. For additional details and alternative embodiments of solution phase halogenation processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company, 1987), particularly pp. 297-300, which are incorporated herein by reference.

The solution polymerization reaction is performed in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers.

Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof.

In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

One or more other catalysts useful in solution copolymerization of isoolefins may also be present in the initiator system, for example titanium tetrachloride, stannous tetrachloride, boron trifluoride, boron trichloride, or methylaluminoxane.

In one embodiment, the butyl rubber polymers monomer mixture preferably contains in the range of from about 70% to about 96% by weight of at least one isoolefin monomer and in the range of from about 4% to about 30% by weight of at least one multiolefin monomer and/or β-pinene, weights based on total weight of monomers. The monomer mixture may contain in the range of from 70% to 94.5% by weight of at least one isoolefin monomer and in the range of from 5.5% to 30% by weight of a multiolefin monomer or β-pinene. The monomer mixture may contain in the range of from 88% to 96% by weight of at least one isoolefin monomer and in the range of from 4% to 12% by weight of at least one multiolefin monomer or β-pinene. The monomer mixture may contain in the range of from 88% to 94.5% by weight of at least one isoolefin monomer and in the range of from 5.5% to 12% by weight of at least one multiolefin monomer or β-pinene.

The monomers are generally polymerized cationically, preferably at temperatures in the range of from about −100° C. to about −50° C., preferably in the range of from about −95° C. to about −65° C. The temperature is preferably about −80° C. or greater.

The solution comprises 0-30 vol % of an aliphatic hydrocarbon diluent, based on volume of the solution. In preferred embodiments, the solution comprises 0.1-30 vol % or 0.1-20 vol % of the aliphatic hydrocarbon diluent. It is particularly preferred and surprising that when the solution comprises 0-30 vol % or 0.1-10 vol % of the aliphatic hydrocarbon diluent, a processable multimodal polyisoolefin-based copolymer of the present invention is obtainable. Decreasing diluent concentration increases initiator efficiency and permits control over the formation of the higher molecular weight fraction. Tuning the amount of diluent in the polymerization permits tuning of the molecular weight distribution in the copolymer produced, which in turn permits tuning of the properties of the copolymer.

The aliphatic hydrocarbon may be in a common aliphatic medium comprising at least 80 wt % of one or more aliphatic hydrocarbons having a boiling point in the range of 45° C. to 80° C. at a pressure of 1013 hPa, preferably at least 90 wt %, and even more preferably at least 95 wt %. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

A C6 solvent is a particularly preferred choice for use in a solution process. A lower molecular weight solvent, such as C5 or lighter, has a boiling point close to the monomers and the monomers therefore may not be separable from the solution by distillation. A higher molecular weight solvent, such as C7 or heavier, would be more difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane.

The common aliphatic medium may, for example, further comprise other compounds which are inert under polymerization conditions such as other aliphatic hydrocarbons, for example heptanes and octanes having a boiling point of more than 80° C. at a pressure of 1013 hPa, propanes, butanes, n-pentane, cyclohexane as well as halohydrocarbons such as methylchloride and other chlorinated aliphatic hydrocarbons which are inert under reaction conditions.

In another preferred embodiment of the invention the common aliphatic medium is substantially free of halogenated hydrocarbons. As used herein the term "substantially free" means a content of halogenated hydrocarbons within the common aliphatic medium of less than 2 wt %, preferably less than 1 wt %, more preferably less than 0.1 wt % and even more preferably absence of halogenated hydrocarbons.

The polymerization process may be performed as a batch process in a batch reactor or a continuous process (e.g. a plug flow process) in a continuous reactor. In a continuous process, the process is preferably performed with at least the following feed streams.

I) solvent/diluent+isoolefin (preferably isobutene)+multiolefin (preferably diene, isoprene);
II) initiator system; and, optionally,
III) a multiolefin cross-linking agent.

It should be noted that the multiolefin crosslinking agent can also be added in the same feed stream as the isoolefin and multiolefin. While cross-linking agents are not necessary to increase molecular weight of the copolymer to a processable level, cross-linking agents may nevertheless be used if desired.

The polymer composition may be formed into a shaped article and then cured. The preferred curing system is sulphur based. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

The cured article may contain further auxiliary products for polymers (e.g. rubbers), such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt %, based on rubber. Further information on vulcanization processes may be obtained in Encyclopedia of Polymer Science and Engineering, Vol. 17, s. 666 et seq. (Vulcanization).

The cured article may comprise one or more aspects which are considered as improved processability due to reduced composition viscosity and elasticity and improved impermeability due to higher filler loading or reduced processing oil loading. Cured articles may be, for example, tire inner liners, tire inner tubes, seals, gaskets or pharmaceutical closures.

EXAMPLES

General Procedures

All polymerizations were performed in an MBraun MB-200G dry box equipped with a pentane cooling bath and a reactor and bath temperature recorder. Hexanes were dried using an MBraun MB-SPS solvent purification system and piped directly into the dry box for use. Isobutylene (i.e. isobutene) and methyl chloride were used without further purification. Ethyl aluminum dichloride (EADC) 1.0 M in hexanes and diethyl aluminum chloride (DEAC) 1.0 M in hexanes were used as received. Isoprene was dried over $CaH_2$ for 24 hours under an inert atmosphere before being vacuum distilled to a separate flask and then introduced into the dry box where it was stored at −2° C. until used.

Initiator Preparation

A master-batch of $EASC/H_2O$ catalyst was prepared by mixing 100 mL of 1.0 M EADC and 100 mL of 1.0 M DEAC in a 1 L Erlenmeyer flask in the dry box. After mixing for 15 minutes the solution was diluted with 800 mL of hexanes and stirring was continued for 1 h. 4.0 mL of de-ionized water was then added slowly to the stirred solution. After the water was added the solution was left stirring for 1 h. The solution was then filtered using a 100 mL glass syringe and 0.45 μm filter discs. The filtered solution was placed into two 500 mL brown glass bottles and stored in the freezer at −2° C. until required.

Polymerization Procedure

A general polymerization recipe was followed with any deviations noted in the following discussion. A 500 mL 3-neck round-bottomed flask was cooled to the reaction temperature (e.g. −80° C.) and 10 mL of hexanes was added. Isobutylene (100 mL) was measured into a chilled graduated cylinder in the cooling bath allowing time to reach the bath temperature before it was added to the reactor flask. Isoprene (10.5 mL) was measured into the reaction flask using a pipette at room temperature. The solution was then stirred at 330 rpm and once the temperature was stabilized the polymerization was initiated with EASC pipetted into the reaction flask with no further cooling. Reactions were normally run for 30 minutes unless otherwise noted or if the temperature increased by more than 15° C., in which case they were terminated. All polymerizations were stopped using a solution of ethanol containing about 1 wt % NaOH. The raw polymer cement was removed from the dry box and about 100 mL of hexanes was added with 1.0 mL of an antioxidant solution (1 wt % Irganox™ 1076 in hexanes). The solution was then coagulated into about 600 mL of stirring ethanol. The rubber was collected and dried in the vacuum oven at 60° C. for 48 hours. Yields were determined gravimetrically.

Polymer Analysis

Analysis of the polymers was performed using a Waters e2695 GPC equipped with 3 Agilent columns (10 μm MixedB) at a flow rate of 1.0 mL/min at 35° C. on solutions containing 4 mg/mL of polymer. Absolute molecular weights were determined using a Wyatt Dawn Helios II light-scattering detector and processed using the ASTRA 5 software package. NMR spectra were recorded on a Bruker 500 MHz NMR spectrometer using $CDCl_3$ solutions with a concentration of about 5 mg/mL. A delay time of 10 seconds was used to collect 32 transients at a pulse angle of 90°. Chemical shifts are reported in ppm for $^1H$ in relation to TMS (δ=0).

Gel content analysis was performed according to a standard internal procedure. 1.0 g of polymer was dissolved in 30 mL of hexanes. The solution was then centrifuged at 20 000 RPM for 2 h after which the solution was discarded and the tube was rinsed with hexanes and left under vacuum for 18 h at 50° C. The weight of the gel was then measured in comparison with the empty tube and calculated according to the following equation: (weight of tube plus residue−weight of tube)×100/weight of sample=percent gel.

Mooney Viscosity

Compound Mooney viscosity measurements were conducted at 125° C. using the MV 2000 rotational viscometer manufactured by Monsanto according to ASTM D1646. For raw polymer Mooney viscosity, the preheat time was 1 min followed by an 8 min run time.

Compounding

A high isoprene (IP) butyl rubber of the present invention (Ex. 33, 7.4 mol % isoprene) as well as three commercial butyl rubbers (RB301 1.8 mol % isoprene, RB402 2.2 mol % isoprene and RB70 7.0 mol % isoprene) were compounded using 100 phr butyl rubber, 50 phr carbon black (CB N 330), 1 phr stearic acid, 5 phr zinc oxide, 1.25 phr sulphur, 1.5 phr 2-mercaptobenzothiazole (MBT) and 1 phr tetramethyl thiuram disulfide (TMTD).

Compounds may be mixed using standard laboratory techniques, and all ingredients used as received. Briefly, the butyl rubber us charged to a Brabender internal mixer with roller rotors (350 g capacity) at 60° C. and 60 rpm. The rubber was allowed to mix alone for a short period of time (1 minute) followed by the addition of stearic acid and carbon black. A sweep was performed at 4 minutes. The compound was mixed for approximately 7 minutes total. Curatives (sulfur, MBT, TMTD and Zinc Oxide) were then added on a two roll mill. After final ingredient addition was complete, the compound was refined with a minimum of 6 three-quarter cuts and 6 endwise passes.

Cure properties were assessed using a Moving Die Rheometer (MDR). Approximately 6 g (+/−0.5 g) of compound were analyzed by MDR cure using a MDR 2000 at a temperature of 160° C. for 30 min with 1° arc following ASTM D-5289. Various cure characteristics (including t90s and ΔS') were recorded.

Polymerization at −80° C.

Examples 1 to 19

The majority of polymerizations were performed at −80° C., although some experiments were performed at higher or lower temperatures to investigate the effect of polymerization temperature on the reaction. For example, FIG. 1 shows that the −65° C. reaction reached a ΔT of about 8.5° C. within three minutes of initiation but the maximum did not last beyond 5 minutes, whereas at −95° C. the reaction slowly increases in temperature over time.

At −80° C. the isoprene content of all samples was 7.7%±0.3% and shows very little variation with respect to conversion, indicating that both monomers are incorporating at similar rates as shown in Table 1. The copolymer produced in the present invention had a bi-modal polymer distribution which was observed and quantified by gel permeation chromatography (GPC). For quantification purposes the GPC traces were analyzed by first measuring the entire polymer which is denoted by the "Bulk Polymer" region and then the high MW portion of the polymer was analyzed by separating the light scattering chromatogram at the inflection point between the two peaks. This technique provides a good approximation of the $M_w$, PDI and mass fraction of the high MW peak.

TABLE 1

High isoprene (IP) solution polymerizations performed at −80° C.[a]

| Example | Hexanes (mL) | Initiator (mL) | Conversion (%) | Solids (%) | Unsaturation 1,4 Isoprene | Unsaturation Total Unsats | Bulk Polymer $M_w$ | Bulk Polymer $M_w/M_n$ | Bulk Polymer $M_z/M_n$ | High MW Fraction $M_w$ | High MW Fraction $M_w/M_n$ | High MW Fraction Mass % |
|---|---|---|---|---|---|---|---|---|---|---|---|---|
| Ex. 1 | 40 | 5.0 | 25.6 | 19.1 | 7.49 | 7.98 | 246 | 3.0 | 12.7 | 1284 | 1.4 | 9.9 |
| Ex. 2 | 40 | 4.0 | 22.0 | 16.4 | 7.60 | 8.05 | 276 | 3.1 | 13.5 | 1491 | 1.4 | 10.1 |
| Ex. 3 | 40 | 4.5 | 18.9 | 14.1 | 7.57 | 8.01 | 227 | 2.6 | 9.8 | 1408 | 1.2 | 6.0 |
| Ex. 4 | 40 | 4.5 | 17.6 | 13.2 | 7.31 | 7.85 | 212 | 2.5 | 8.4 | 1240 | 1.2 | 6.3 |
| Ex. 5 | 40 | 4.0 | 12.8 | 9.6 | 7.77 | 8.18 | 190 | 2.0 | 4.8 | 1092 | 1.1 | 3.3 |
| Ex. 6 | 40 | 4.0 | 10.0 | 7.4 | 7.17 | 7.56 | 175 | 2.5 | 6.4 | 1014 | 1.1 | 4.3 |
| Ex. 7 | 40 | 4.25 | 8.4 | 6.3 | 7.44 | 7.83 | 192 | 2.1 | 5.5 | 1182 | 1.1 | 3.7 |
| Ex. 8 | 40 | 3.0 | 5.8 | 4.3 | 7.65 | 8.05 | 178 | 2.0 | 6.0 | 1257 | 1.2 | 3.1 |
| Ex. 9 | 20 | 4.0 | 24.8 | 21.1 | 7.02 | 7.52 | 266 | 3.0 | 13.3 | 1519 | 1.4 | 9.4 |
| Ex. 10 | 20 | 2.5 | 4.6 | 3.9 | 7.01 | 7.36 | 212 | 2.2 | 7.3 | 1411 | 1.2 | 4.7 |
| Ex. 11 | 15 | 2.1 | 20.8 | 19.9 | 6.98 | 7.38 | 671 | 3.7 | 17.9 | 3455 | 1.4 | 13.7 |
| Ex. 12 | 10 | 2.5 | 31.6 | 29.1 | 6.99 | 7.47 | 568 | 4.1 | 22.0 | 2924 | 1.5 | 14.1 |
| Ex. 13 | 10 | 3.0 | 30.4 | 25.9 | 6.97 | 7.43 | 659 | 3.8 | 18.6 | 3127 | 1.5 | 15.3 |
| Ex. 14 | 10 | 2.3 | 27.4 | 25.2 | 6.96 | 7.39 | 630 | 3.8 | 18.1 | 3069 | 1.5 | 14.7 |
| Ex. 15 | 10 | 2.1 | 23.9 | 22.0 | 7.36 | 7.78 | 583 | 4.2 | 23.4 | 3180 | 1.5 | 13.0 |
| Ex. 16 | 10 | 2.1 | 23.8 | 21.9 | 7.07 | 7.50 | 601 | 3.5 | 17.1 | 3059 | 1.5 | 13.3 |
| Ex. 17 | 10 | 2.1 | 18.9 | 17.5 | 7.27 | 7.66 | 508 | 4.3 | 27.0 | 2754 | 1.6 | 13.3 |
| Ex. 18 | 5 | 2.1 | 16.7 | 14.8 | 6.91 | 7.32 | 480 | 3.5 | 17.7 | 2624 | 1.5 | 12.0 |
| Ex. 19 | 0 | 3.0 | 28.9 | 24.6 | 6.96 | 7.41 | 596 | 3.9 | 19.3 | 3014 | 1.5 | 14.1 |

[a] 30 minute reaction time using 100 mL of IB and 10.75 mL IP

Figure 2:
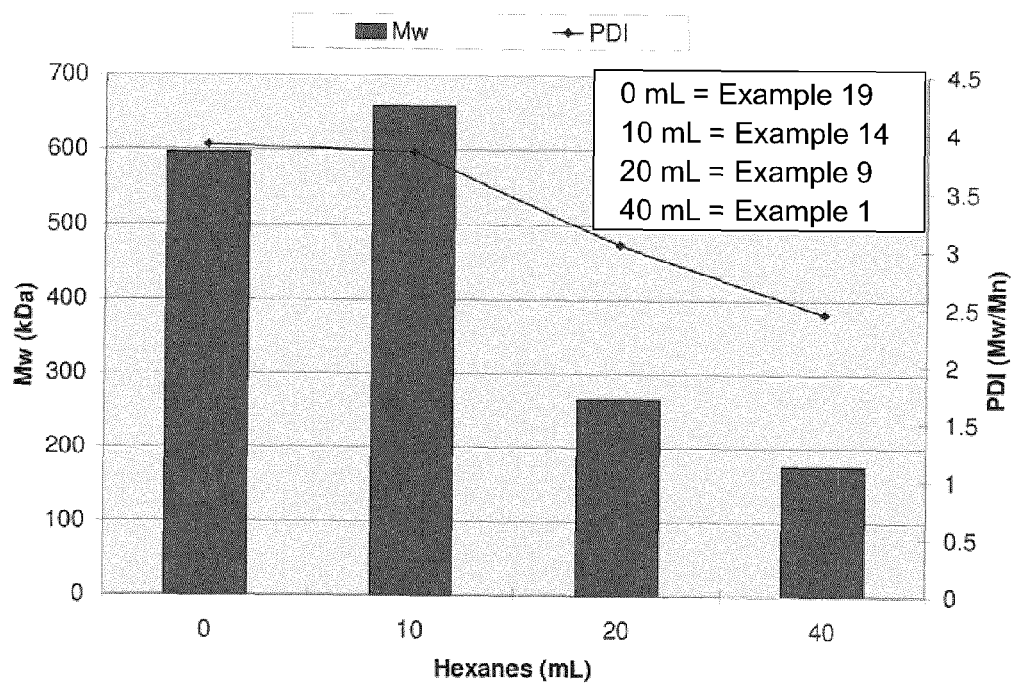
FIG. 2 depicts a graph comparing bulk polymer $M_w$'s at about 27% conversion with varying hexanes levels.

For the same conversion, decreasing the hexanes solvent increases the $M_w$ of the bulk polymer dramatically as shown in FIG. 2. This effect can be observed as the $M_w$ of the reaction with 40 mL of hexanes is about 180 kDa and increases to about 660 kDa when the solvent is reduced to 10 mL of hexanes.

Figure 3:
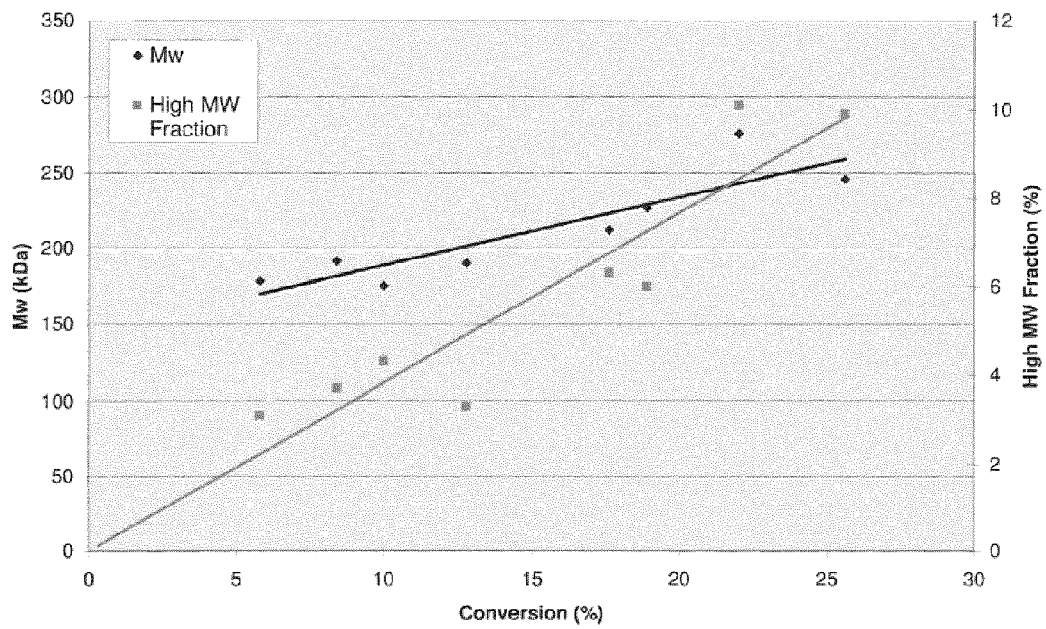
FIG. 3 depicts a graph correlating $M_w$ and high MW fraction with conversion at −80° C. in 40 mL hexanes for a copolymer composition of the present invention.
Figure 5:
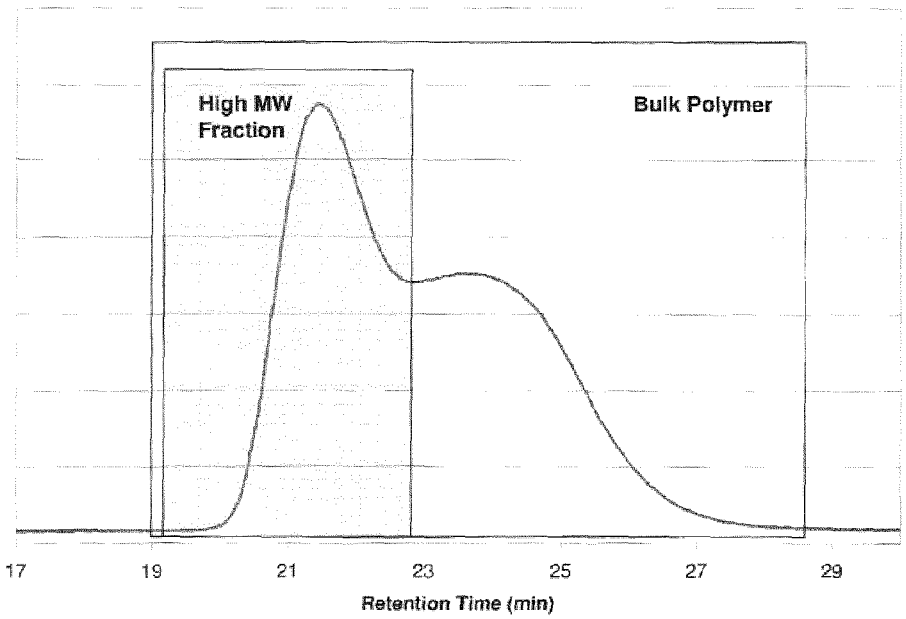
FIG. 5 depicts a GPC trace showing the bi-modal molecular weight distribution of a high isoprene (IP) rubber of the present invention with high MW fraction high-lighted on the left.

Decreasing the hexanes solvent from 40 mL to 10 mL, while maintaining the same levels of isobutylene and isoprene, had a major impact on the higher molecular weight fraction of the polymer resulting in a large increase in both the bulk polymer $M_w$ and the $M_z/M_n$ values (see FIG. 2). The $M_w$ of the high MW fraction also doubled, but this effect may be related to the increased conversions observed for the reactions with a 10 mL hexanes solvent level. The high MW fraction wt % was also observed to increase with conversion (Table 1 and FIG. 3). The polymer produced using such conditions has a bi-modal GPC trace (see for example FIG. 5) with 3-15% of the bulk polymer comprising a higher MW fraction. At a given solvent level, the $M_w$ of the bulk polymer correlates well with the conversion indicating that the high molecular weight fraction increases as the reaction progresses. This effect is reflected in both the $M_z/M_n$ values and the Mass % (High MW), both of which increase with conversion.

Overall these Examples have demonstrated the ability to synthesize high isoprene IIR rubber at −80° C. using a solution process. The target polymer molecular weight with an Mw greater than 300 kDa can be achieved by lowering the amount of hexanes solvent present in the reaction mixture which also increases initiator efficiency.

Example 20-26: Polymerization at −65° C.

At −65° C. it was possible to produce rubber in appreciable conversions (Table 2) with high isoprene levels. The molecular weight of the polymers produced at −65° C. (Examples 24-26) are significantly lower than the −80° C. experiments (Examples 12-17). This is most likely due to more chain transfer occurring at the higher reaction temperature. Reducing the amount of hexanes from 40 mL to 10 mL resulted in a large increase in the molecular weight which nearly doubles at the reduced solvent levels. The copolymer materials still show the same bi-modal molecular weight distribution and there is an increase in the $M_z/M_n$ values indicating the formation of the high molecular weight fraction. Though it was not possible to obtain the same $M_w$'s as the −80° C. reactions, the −65° C. runs did achieve $M_w$'s in excess of 250 kDa with isoprene content in the range of 7-8% total unsats.

TABLE 2

High isoprene (IP) solution polymerizations performed at −65° C.[a]

| Ex. | Hex. (mL) | Initiator (mL) | Conv. (%) | Solids (%) | Unsaturation 1,4 IP | Unsaturation Total Unsats | Bulk Polymer $M_w$ | Bulk Polymer $M_w/M_n$ | Bulk Polymer $M_z/M_n$ | High MW Fraction $M_w$ | High MW Fraction $M_w/M_n$ | High MW Fraction Mass % |
|---|---|---|---|---|---|---|---|---|---|---|---|---|
| Ex. 20 | 40 | 4.5 | 17.6 | 12.3 | 7.86 | 8.55 | 148 | 2.6 | 10.5 | 914 | 1.3 | 7.1 |
| Ex. 21 | 40 | 3.5 | 13.1 | 9.5 | 7.91 | 8.56 | 135 | 2.2 | 8.1 | 1150 | 1.1 | 2.7 |
| Ex. 22 | 40 | 6.5 | 12.0 | 8.5 | 7.63 | 8.27 | 121 | 2.0 | 4.6 | 776 | 1.1 | 2.6 |
| Ex. 23 | 40 | 5.5 | 10.2 | 7.3 | 7.62 | 8.24 | 122 | 2.1 | 5.0 | 845 | 1.2 | 2.2 |

TABLE 2-continued

High isoprene (IP) solution polymerizations performed at −65° C.[a]

| | | | | | Unsaturation | | Bulk Polymer | | | High MW Fraction | | |
|---|---|---|---|---|---|---|---|---|---|---|---|---|
| | | | | | | | | GPC Analysis (kDa) | | | | |
| Ex. | Hex. (mL) | Initiator (mL) | Conv. (%) | Solids (%) | 1,4 IP | Total Unsats | $M_w$ | $M_w/M_n$ | $M_z/M_n$ | $M_w$ | $M_w/M_n$ | Mass % |
| Ex. 24 | 10 | 2.1 | 36.9 | 34.0 | 6.82 | 7.50 | 265 | 5.2 | 44.9 | 2009 | 1.7 | 9.3 |
| Ex. 25 | 10 | 1.9 | 27.6 | 25.4 | 6.83 | 7.42 | 256 | 4.1 | 30.1 | 1879 | 1.5 | 8.7 |
| Ex. 26 | 10 | 2.1 | 21.5 | 19.8 | 7.01 | 7.56 | 268 | 4.6 | 38.8 | 2156 | 1.6 | 8.4 |

[a]30 minute reaction time using 100 mL of IB and 10.75 mL IP

Example 27-32: Polymerization at −95° C.

Figure 4:
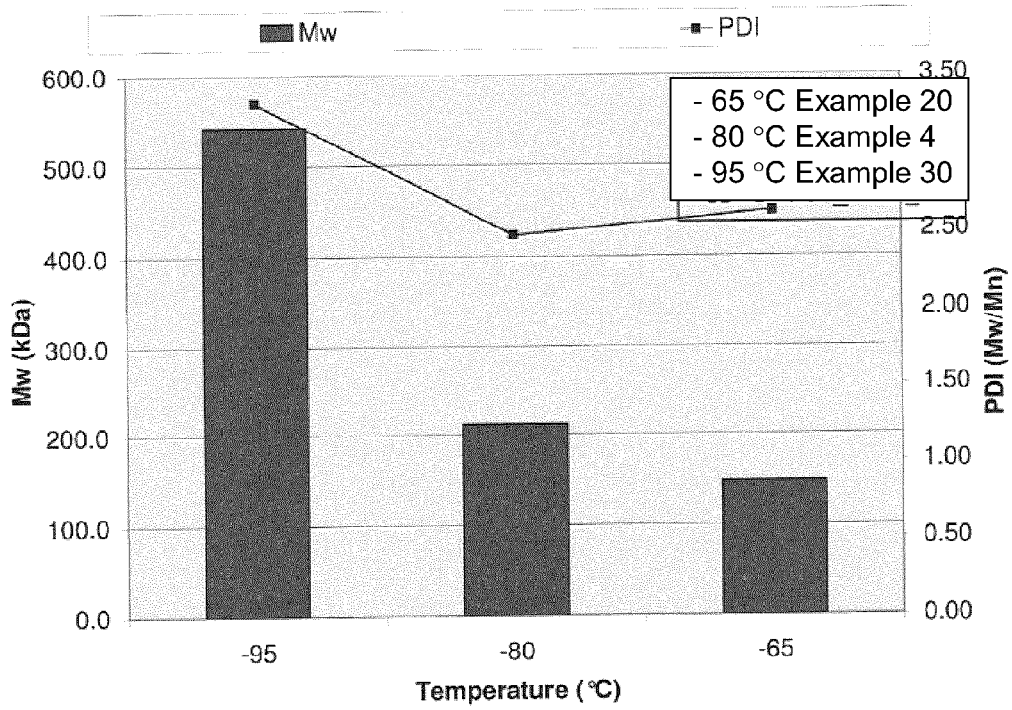
FIG. 4 depicts a graph comparing bulk polymer $M_w$'s at about 18% conversion at different temperatures.

Polymerizations performed at −95° C. resulted in good conversions, although the IP content was slightly higher than targeted (Table 3). The bulk polymer had $M_w$'s over 500 kDa in the more dilute 40 mL hexanes solvent system as would be expected due to the suppression of chain transfer reactions. The mass % of the high MW polymer fraction was much higher than at the other temperatures for the 40 mL hexanes solvent level but at the reduced hexanes level the mass % of the high MW fractions were similar. The temperature dependence of $M_w$ between the three experimental temperatures (using 40 mL of hexanes) is shown in FIG. 4, where the experiments at −95° C. produced the highest $M_w$'s and −65° C. produced the lowest. The PDI at −95° C. was also broader, indicating the possible formation of a more branched material. These experiments show that it is possible to generate very high molecular weight, high isoprene butyl using a solution process.

Ethyl aluminum dichloride (EADC) 20 wt % in hexanes and diethyl aluminum chloride (DEAC) 20 wt % in hexanes were used as received. Isoprene was dried over 3 Å molecular sieves for 24 hours under an inert atmosphere before use.

Initiator Preparation:

A solution of EASC/H$_2$O initiator was prepared by mixing 304.6 g of 20 wt % EADC and 289.3 g of 20 wt % DEAC in 1634 g of dry hexane in an 8 L stainless steel vessel. The solution was stirred for 10 minutes. 25 g of de-ionized water was then added slowly under nitrogen blanket to the stirring solution using an ISCO model 500D syringe pump at a rate of 0.5 mL/min. After the water was added the solution was left stirring for 30 minutes and then passed through a filter system using nitrogen and 140 μm filter elements. The filtered solution was collected in a second 8 L stainless steel vessel and stored at room temperature under inert atmosphere.

TABLE 3

High isoprene (IP) solution polymerizations performed at −95° C.[a]

| | | | | Unsaturation | | GPC Analysis (kDa) | | | | | |
|---|---|---|---|---|---|---|---|---|---|---|---|
| | | | | | | Bulk Polymer | | | High MW Fraction | | |
| Example | Hexanes (mL) | Initiator (mL) | Conversion (%) | Solids (%) | 1,4 Isoprene | Total Unsats | $M_w$ | $M_w/M_n$ | $M_z/M_n$ | $M_w$ | $M_w/M_n$ | Mass % |
| Ex. 27 | 40 | 4.5 | 29.5 | 20.96 | 8.50 | 9.01 | 628 | 3.7 | 15.4 | 2792 | 1.3 | 15.5 |
| Ex. 28 | 40 | 3.0 | 25.4 | 19.05 | 7.72 | 8.08 | 701 | 3.7 | 16.8 | 3095 | 1.5 | 16.2 |
| Ex. 29 | 40 | 5.5 | 21.0 | 15.19 | 9.18 | 9.62 | 634 | 3.4 | 13.7 | 2888 | 1.3 | 14.5 |
| Ex. 30 | 40 | 6.5 | 20.2 | 14.51 | 8.88 | 9.31 | 542 | 3.3 | 12.1 | 2294 | 1.8 | 15.3 |
| Ex. 31 | 40 | 2.5 | 8.4 | 6.28 | 7.42 | 7.72 | 303 | 2.7 | 11.3 | 1664 | 1.4 | 8.7 |
| Ex. 32 | 10 | 2.1 | 10.4 | 9.58 | 7.14 | 7.42 | 517 | 3.0 | 12.8 | 2162 | 1.5 | 15.3 |

[a]30 minute reaction time using 100 mL of IB and 10.75 mL IP

Example 33—Continuous Solution Polymerization

To demonstrate the utility of this methodology in a continuous process, Example 33 was generated using continuous feeding of solvent, monomer and initiator streams into a continuously stirred reactor and the over flow was collected and the polymer isolated using standard techniques.

Experimental

Polymerizations were performed in a 2 L continuous stainless steel reactor which is equipped with a special agitator for viscous liquids. Hexanes were purchased from Univar Canada and were dried prior to use by circulating continuously through a column of activated 3 Å molecular sieves for 24 h and then stored under an inert atmosphere.

Continuous Polymerization Procedure:

Continuous polymerizations were run according to details outlined in Table 4. The propane cooling fluid to the reactor was set to −88° C. and kept constant, while the feed cooling was set to −95° C., resulting in a feed temperature of −75° C. before entering the reactor. The mixed feed (MF) rate was set to 6.69 kg/hr. Hexanes and isobutylene were added with Lewa dosing pumps and K-tron gravimetric meters. Isoprene was added into the reactor using a Prominent dosing pump and an Endress & Hauser flowmeter. Polymerizations were run for 4 to 10 hrs targeting stable conditions between 10 and 12 wt % solids by adjusting the initiator flow rate. The polymerization was terminated by adding 20 ml of methanol as shortstop to the cement in the discharge line. Small solids samples were taken every 30 min and a larger sample once per run. Samples were steam coagulated and dried on a 10×20 mill set at 105° C. to constant weight. Solids levels were determined gravimetrically.

TABLE 4

Stable Continuous Reactor Run Conditions:

| Example | MF-rate [kg/hr] | IB wt % | IP wt % | Hexanes wt % | Initiator [g/hr] | Rx-Temp (° C.) | Solids wt % |
|---|---|---|---|---|---|---|---|
| Ex. 33 | 6.69 | 86.0 | 8.9 | 5.1 | 150 | −80 | 10.7-11.8 |

To generate enough material for further compounding examples, 3 different batches which were run under the same experimental conditions were combined through milling. The following is a brief description of the procedure used, but should not be considered limiting and other modifications of the procedure can be made by those skilled in the art to arrive at similar outcomes of the polymerization. Characterization for the blended material (Example 33) is given in Table 5:

TABLE 5

Selected characterization data for the copolymer made according the the present invention employing a continuous solution polymerization process.

| | Unsaturation | | GPC Analysis (kDa) | | | | |
| | 1,4 | Total | Bulk Polymer | | | High MW Fraction | |
| Example | Isoprene | Unsats | $M_w$ | $M_w/M_n$ | $M_z/M_n$ | $M_w$ | $M_w/M_n$ | Mass % |
|---|---|---|---|---|---|---|---|---|
| Ex. 33 | 7.1 | 7.4 | 800 | 3.5 | 14.8 | 4595 | 1.1 | 10.4 |

Size Exclusion Chromatography:

The copolymer produced in the present invention had a bi-modal polymer distribution which was observed and quantified by gel permeation chromatography (GPC). For quantification purposes the GPC traces were analyzed by first measuring the entire polymer which is denoted by the "Bulk Polymer" region in FIG. 5 and then the high MW portion of the polymer was analyzed by separating the light scattering chromatogram at the inflection point between the two peaks. This technique provides a good approximation of the $M_w$, PDI and mass fraction of the high MW peak.

Figure 6:
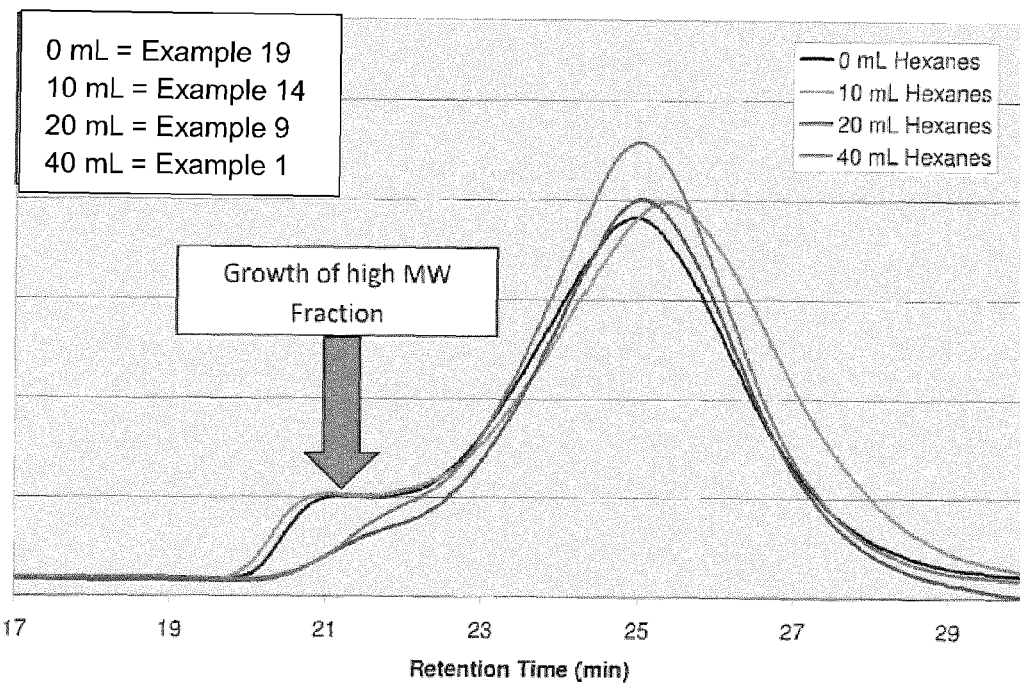
FIG. 6 depicts refractive index GPC traces of a high isoprene (IP) rubber of the present invention demonstrating the effect of lowering the hexanes concentration at −80° C. at about 27% conversion.
Figure 7:
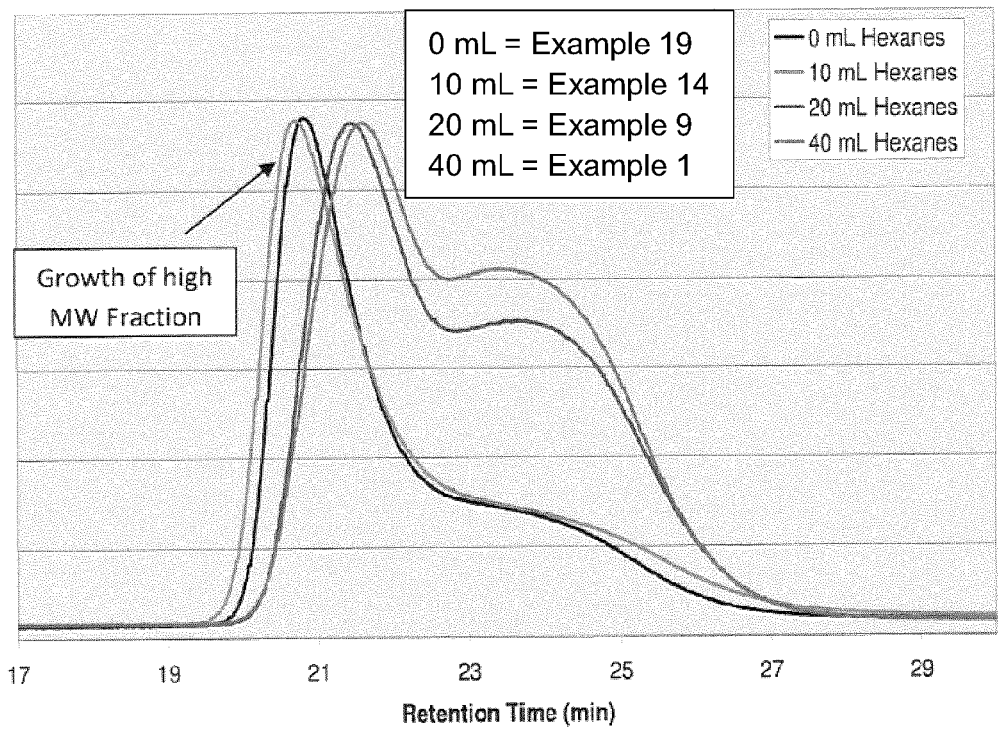
FIG. 7 depicts light scattering GPC traces of a high isoprene (IP) rubber of the present invention demonstrating the effect of lowering the hexanes concentration at −80° C. at about 27% conversion.

The GPC traces provide insight into how the polymer architecture changes as the hexanes solvent is reduced. In FIG. 6, the refractive index trace shows that as the concentration of hexanes is lowered a shoulder begins to grow at earlier elution times indicating the formation of higher molecular weight polymer. Since the light-scattering instrument is more sensitive to higher molecular weights, the shift to the higher molecular weight fraction becomes even more apparent with a large shoulder appearing at about 20 minutes elution time (FIG. 7). The growth of the high molecular weight shoulder increases with increasing conversion. In the case of commercial grades of butyl rubber, the growth of a high molecular weight shoulder has also been observed in solution production, however such growth in the case of commercial grades of butyl rubber is an indicator of gel-formation.

Polymer Gel Content:

Since the formation of large amounts of gel is undesirable in a continuous reactor process, the amount of gel formation of several batch reactor polymerizations were measured (see Table 6). Gel content was quite low over all conversions as the maximum gel was 2.5% with an average value of 1.1% gel content for all of the batches. This range is comparable to the commercially produced polymers Ex. 34 (RB301) and Ex. 35 (RB402). The hexanes concentration did not appear to impact the gel formation and perhaps most surprisingly neither did conversion or temperature.

TABLE 6

Gel content for selected copolymers.

| Example | Hexanes (mL) | Conversion (%) | Temperature (° C.) | Gel Content (%) |
|---|---|---|---|---|
| Ex. 34 | — | — | — | 0.82 |
| Ex. 35 | — | — | — | 2.15 |
| Ex. 24 | 10 | 36.9 | −65 | 0.30 |
| Ex. 26 | 10 | 21.5 | −65 | 1.19 |
| Ex. 1 | 40 | 25.6 | −80 | 0.76 |
| Ex. 9 | 20 | 24.8 | −80 | 1.13 |
| Ex. 12 | 10 | 31.6 | −80 | 0.97 |
| Ex. 13 | 10 | 30.4 | −80 | 0.95 |
| Ex. 19 | 0 | 28.9 | −80 | 2.49 |
| Ex. 28 | 40 | 25.4 | −95 | 0.95 |
| Ex. 32 | 10 | 10.4 | −95 | 1.30 |

Polymer Mooney Viscosity:

The Mooney Viscosity (MV) values for these materials were lower than the commercial grades of rubber and are related to the bi-modal character of the polymer. Although the bulk $M_w$ of the high IP polymers is similar to the commercial grades (Table 7) they are skewed to a higher bulk molecular weight by the presence of the high molecular weight fraction. The bulk high IP material contains polymer chains which are shorter than the commercial products which act to plasticize the polymer at the elevated test temperature. These low Mooney values indicate that these materials will show improved processing characteristics. Despite the low Mooney values these materials do not behave as typical low Mooney materials due to the presence of the high molecular weight fraction.

TABLE 7

Mooney Viscosity for selected samples (ML 1 + 8 @ 125° C.).

| Experiment | Temperature (° C.) | Hexanes (mL) | Bulk $M_w$ (kDa) | ML (1 + 8) @ 125° C. (MU) |
|---|---|---|---|---|
| Ex. 34 | −92 | — | 577 | 52 |
| Ex. 35 | −92 | — | 433 | 33 |
| Ex. 36 | −92 | — | 846 | 39 |
| Ex. 19 | −80 | 0 | 596 | 13 |
| Ex. 13 | −80 | 10 | 658 | 10 |
| Ex. 14 | −80 | 10 | 630 | 13 |
| Ex. 15 | −80 | 10 | 583 | 13 |
| Ex. 16 | −80 | 10 | 601 | 18 |

Examples 34 through 36 are comparative examples, synthesized using conventional practices with MeCl as diluent, in a commercial butyl rubber production plant.

Dynamic mechanical spectra and creep analysis were obtained with the MCR 301 stress controlled Rheometer using 25 mm diameter and 1 mm thick samples cut from a compression molded sheet. The viscous flow behavior of the polymers at 20° C. under a shear stress of 100 Pa indicate significant decreases in the creep compliance values. The zero shear viscosity ($\eta_o$) can be determined from the steady state Newtonian compliance. Selected data from these tests is summarized in Table 8.

TABLE 8

Creep testing of selected polymers at 20° C. under a shear stress of 100 Pa, and the corresponding Mooney Viscosity values for commercial and copolymers of the present invention.

| Sample | Total Unsats (%) | GPC $M_w$ (kg/mol) | PDI | Mass % High MW Fraction | Mooney (ML 1 + 8 @ 125° C.) | $\eta_o$ (Pa·s) × $10^7$ |
|---|---|---|---|---|---|---|
| Ex. 9 | 7.5 | 266 | 3.0 | 9.4 | 7 | 0.63 |
| Ex. 33 | 7.4 | 724 | 3.5 | 9.7 | 21 | 5.3 |
| Ex. 34 | 1.8 | 577 | 3.5 | — | 52 | 33.0 |
| Ex. 35 | 2.2 | 433 | 2.5 | — | 33 | 5.7 |

The creep compliance increases significantly for Ex. 9, indicating both a much lower MW and degree of branching. The zero shear viscosity can be determined from the steady state Newtonian compliance:

$$\eta_o = (t - t_0)/J_N(t)$$

where J(t) is the creep compliance at time t, $\eta_o$ is the zero shear viscosity, $t_0$ is the initial time, and $J_N(t)$ is the Newtonian creep compliance (Rubinstein M, Colby R. *Polymer Physics*. Oxford Press 2003, 288-290). The zero shear viscosity of a copolymer of the present invention (Ex. 33) is similar to that of commercial IIR (Ex. 35) (see FIG. 9), despite the significant differences in the Mw and Mooney viscosity values for the two polymers (see Table 6). This difference may be a result of long chain branching in Ex. 33. Mooney Viscosity (ML 1+8) at 125° C. for Ex. 33 was 21 and for Ex. 35 was 33. Creep ($\eta_o$, Pa·s) for Ex. 33 was 5.3×10$^7$ and for Ex. 35 was 5.7×10$^7$. Having a significantly lower Mooney viscosity, while maintaining good dimensional stability (as indicated by the nearly equivalent zero shear viscosity values) is an advantage when processing such materials into shapes, as the energy required to mix will be reduced (corresponding to the low Mooney Viscosity of the raw polymer) while the dimensional stability will be maintained or possibly improved relative to current commercial products. The ability for an uncured article to maintain the molded shape (dimensional stability) prior to vulcanization is an advantage in that the shaped article can then be stored and handled prior to vulcanization without significant change to the shape of the molded compound causing potential defects or scrap during production.

Figure 8:
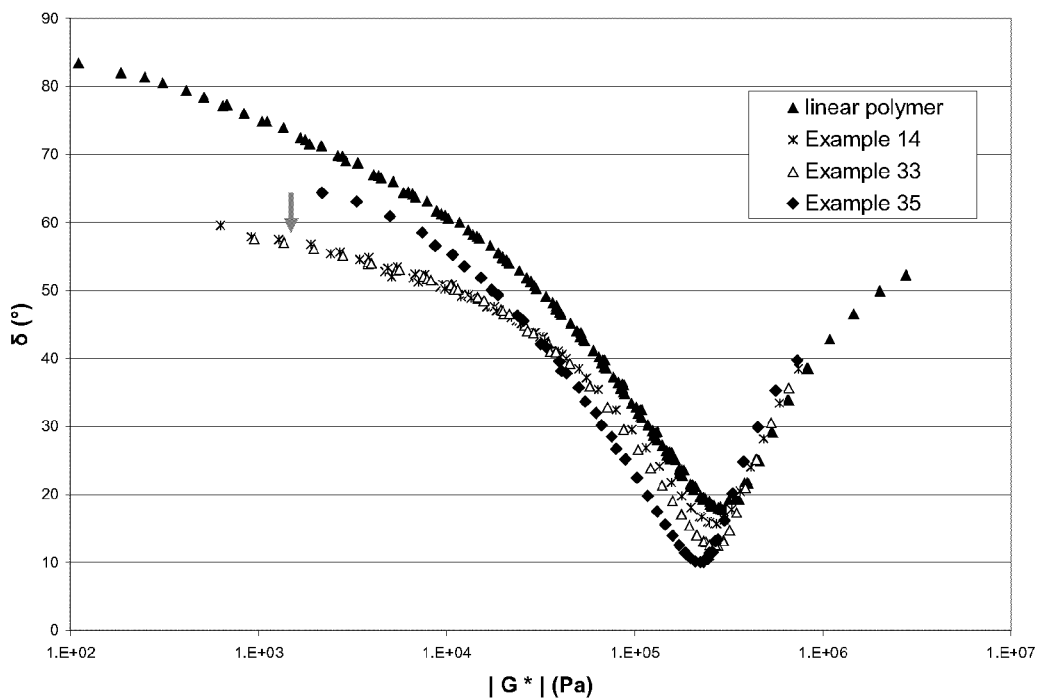
FIG. 8 depicts a van Gurp Palmen plot at $T_r$=20° C. of high isoprene polymers compared with linear behavior.

FIG. 8 demonstrates the viscoelastic response of butyl polymers with that of a known linear polymer by way of a van Gurp-Palmen plot. Here, the phase angle is plotted against the complex modulus, eliminating the time and temperature dependent responses. Polymers with specific architecture have a characteristic shape to the van Gurp-Palmen plot. The more random long chain branching there is in a material, the lower the phase angle at lower complex modulus. The GPC results of the high isoprene polymers show bimodality. The shape of the van Gurp-Palmen plots of the high isoprene polymers suggest that these are blends of linear with random long-chain branched components. The polyisoolefin-based copolymer compositions of the present invention results in random long chain branching without the addition of any multifunctional branching reagents. The branching is a consequence of the polymerization conditions and not from additional crosslinking reagents added to the process. Similar to the shape of a solution high isoprene polymer plot, random long-chain branched polymers have a characteristic profile that includes minima associated with the linear chains along with an undeveloped second minima and a lack of a plateau at 90° (Trinkle S, Fredrich C. *Rheol Acta*. 2001, 40: 322-328; Trinkle et al. *Rheol Acta*. 2002, 41: 103-113). The degree of branching increases from Ex. 33 to Ex. 9. The branched composition in the high molecular weight fraction of these materials is important to improved rheological behavior. Compared to the current butyl materials (RB402 used for comparison) these materials display a phase angle of less than 60° for complex moduli less than 10,000 Pa (see FIG. 8).

Example 37: Compounding

High isoprene (IP) butyl rubber of the present invention (Ex. 33) as well as three butyl rubber samples produced using slurry polymerization methods (Ex. 34-36) were compounded into vulcanizates in accordance with the general procedure outlined above. Table 9 shows the isoprene (IP) content and Mooney Viscosity of each butyl rubber. Ex 33 has lower Mooney Viscosity and higher unsaturation than the butyl rubbers produced using slurry polymerization methods.

TABLE 9

Characterization of copolymer made from the present invention, and comparative examples 34-36.

| Butyl Rubber | IP Content (mol %) | Mooney Viscosity (ML 1 + 8 @ 125° C.) |
|---|---|---|
| Ex. 33 | 7.4 | 21 |
| Ex. 34 | 1.8 | 51 |
| Ex. 35 | 2.2 | 33 |
| Ex. 36 | 6.9 | 39 |

Figure 9:
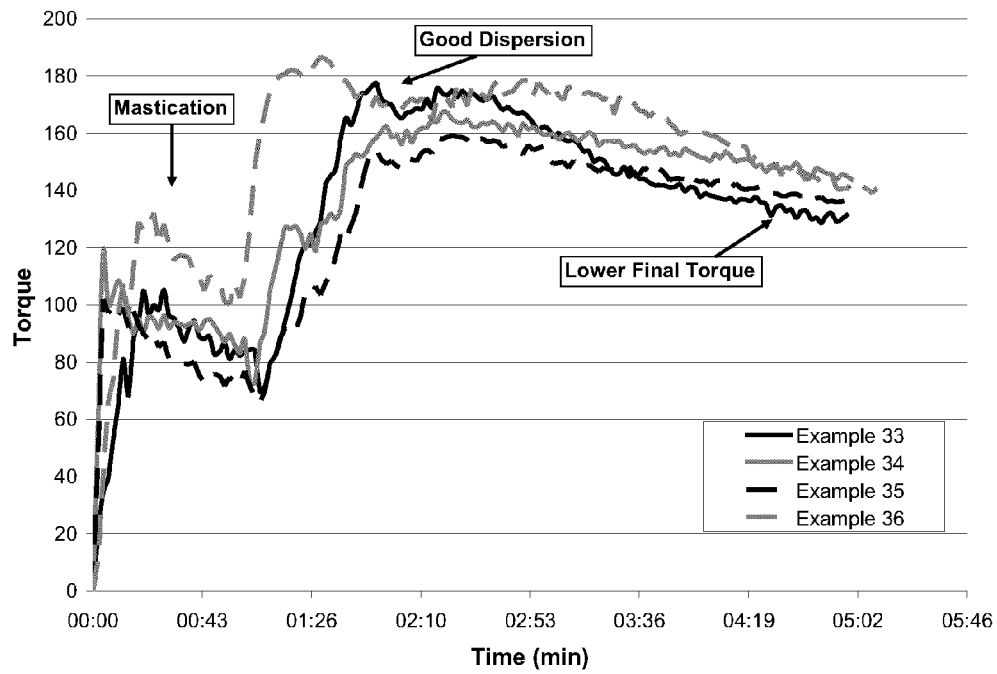
FIG. 9 depicts a graph of torque vs. time (min) during processing of a high isoprene (IP) rubber (Ex. 33) of the present invention and three commercial IIRs (Ex. 34, Ex. 35 and Ex. 36)
Figure 10:
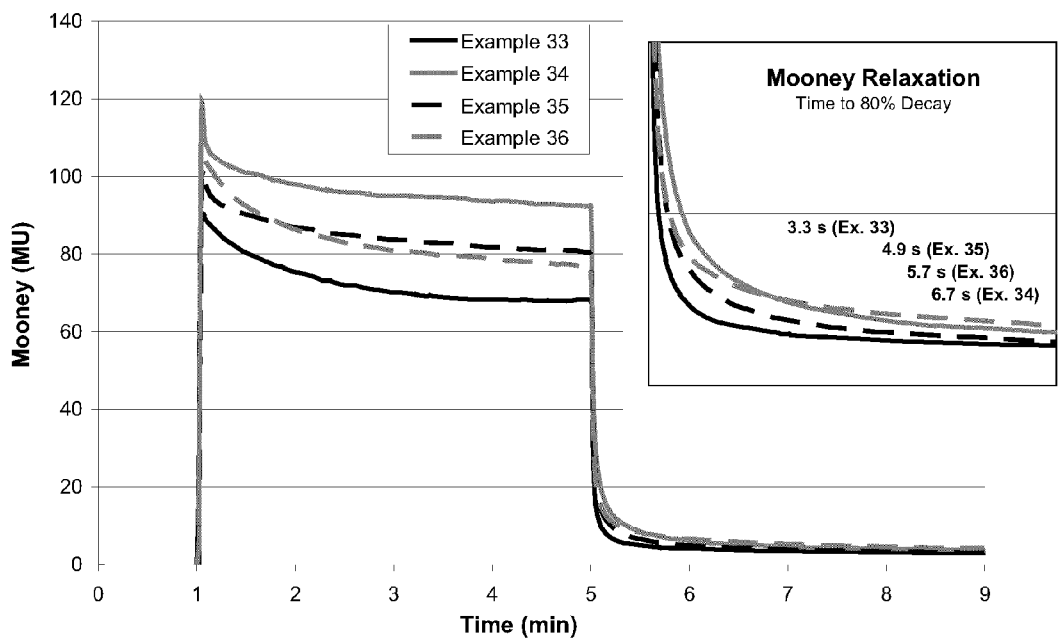
FIG. 10 depicts a graph of Mooney Viscosity (MU) vs. time (min) during processing of a high isoprene (IP) rubber (Ex. 33) of the present invention and three commercial IIRs (Ex. 34, Ex. 35 and Ex. 36)

During the preparation of the vulcanizates before mixing the curatives, torque measurements on each mix were taken using ASTM D3182 at 60° C. and 60 rpm. As seen in FIG. 9, Ex. 33 exhibits improved mixing characteristics having the lowest final torque of all the butyl rubbers tested. Improved processability of Ex. 33 was further demonstrated by measuring Mooney Relaxation in accordance with ASTM D1646 (ML 1+4+4 @ 100° C.). FIG. 10 shows that Ex. 33 has the lowest Mooney Viscosity throughout processing and the fastest time to 80% decay. Experiments involving the injection and transfer molding of the butyl rubbers also demonstrate that Ex. 33 flows better than the tested commercial (slurry polymerization polymers) butyl rubbers. The compositionally homogeneous butyl rubber of the present invention is therefore more processable than commercial butyl rubbers tested.

Figure 11:
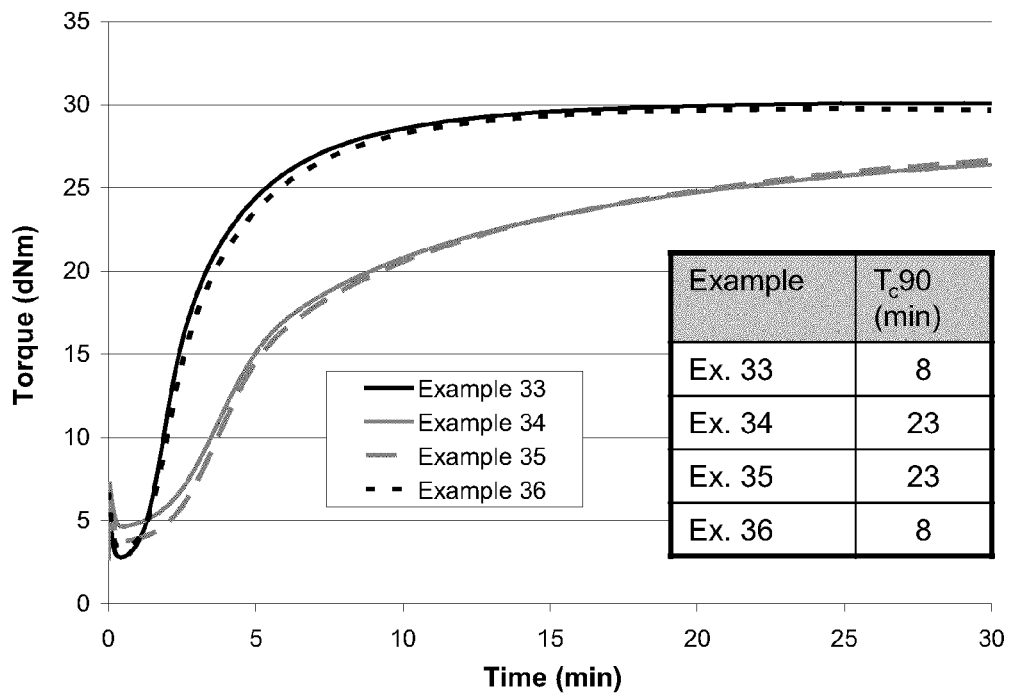
FIG. 11 depicts a graph of torque (dNm) vs. time (min) showing the cure rate of a high isoprene (IP) rubber (Ex. 33) of the present invention and three commercial IIRs (Ex. 34, Ex. 35 and Ex. 36); and, FIG. 12 depicts a graph of stress (MPa) vs. strain (%) showing the modulus of a high isoprene (IP) rubber (Ex. 33) of the present invention and three commercial IIRs (Ex. 34, Ex. 35 and Ex. 36).

Cure rates were also tested using ASTM D5289 (1° arc, 160° C.). As seen in FIG. 11, Ex. 33 has a significantly faster cure rate than Ex. 34 and Ex. 35 for the same amount of curatives. Therefore, total curative loading can be adjusted/reduced to achieve the same cure rate as commercial butyl rubbers. Such an increase in cure rate can be an advantage for improved throughput in industrial processes.

Figure 12:
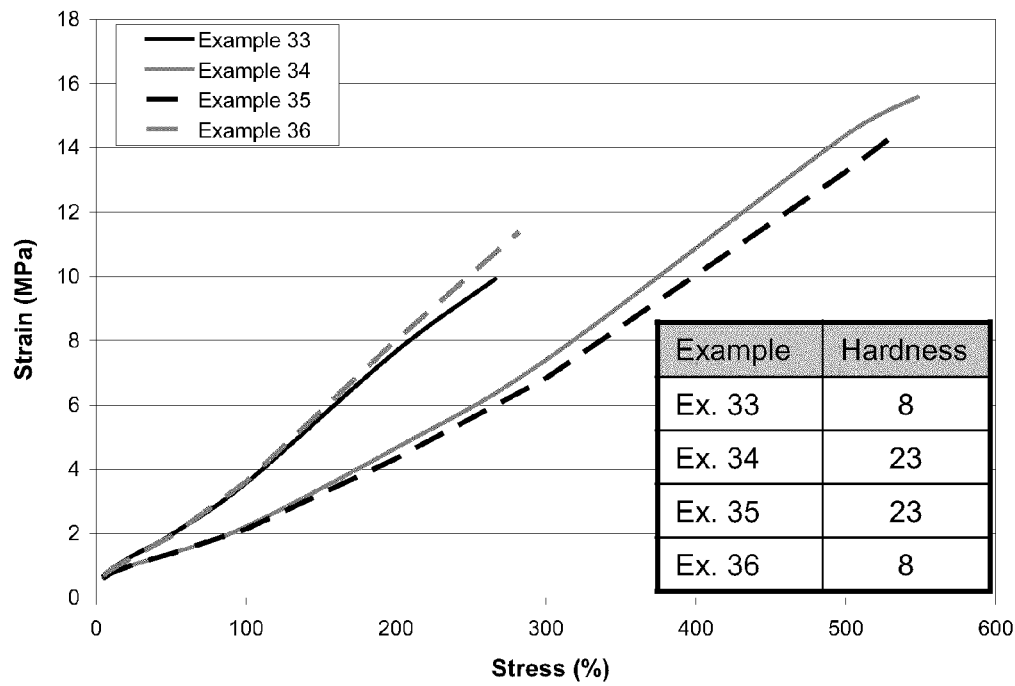

The modulus (stress vs. strain) was also tested using ASTM D-412 Method A. As seen in FIG. 12, Ex. 33 has a hardness equivalent to Ex. 36 and better than Ex. 34 and Ex.

35. It is therefore possible to adjust/reduce curative levels and achieve the same modulus as the vulcanizate obtained from commercial butyl rubber samples Ex. 34 and Ex. 35. In addition Ex. 33 appears to have a higher cross-linking density and improved physical properties in comparison to commercial butyl rubbers.

Copolymer compositions of the present invention have a weight average molecular weight in an appropriate range to be processable while maintaining necessary physical characteristics and dimensional stability of cured articles made from the polyisoolefin-based copolymer composition. Prior art solution processes to produce highly unsaturated polyisoolefin-based copolymer compositions generally result in materials having molecular weights so low that they cannot be processed into finished articles. Reducing the process temperature in such prior art processes increases molecular weight of the resulting materials but results in the formation of gels. The present process permits the production of highly unsaturated polyisoolefin-based copolymers with low gel formation while being able to control the amount of higher molecular weight fraction, and thus controlling the weight average molecular weight of the copolymer.

It is known that when the phase angle is plotted against the complex modulus, the time and temperature dependent responses of a polymer are separated out. Polymers with specific architecture therefore have a characteristic shape. The more long chain branching there is in a material, the lower the phase angle at lower complex modulus. The shape of the plot of these compositionally homogenous copolymer materials indicate that these materials contain long-chain branched components. (Trinkle S, Fredrich C. *Rheol Acta.* 2001, 40: 322-328; Trinkle et al. *Rheol Acta.* 2002, 41: 103-113). As a result the copolymer composition may have a phase angle of 60° or less when the copolymer composition has a complex modulus of 10,000 Pa or less.

The high solids content achieved through use of the solution process described herein results in more economic operation. It is therefore desirable that processes of the present invention operate at solids levels of greater than 10%, greater than 15%, greater than 18%, greater than 20%, greater than 22%, greater than 25%, greater than 28% or greater than 30%.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A polyisoolefin-based copolymer composition comprising a multimodal molecular weight distribution, wherein:
the multimodal molecular weight distribution comprises:
a first molecular weight fraction having a peak molecular weight ($M_p$) of less than about 300 kg/mol, and
a second molecular weight fraction having a peak molecular weight ($M_p$) at least 3 times greater than the $M_p$ of the first molecular weight fraction, and
the copolymer composition has a level of unsaturation of greater than about 3 mol %.

2. The composition according to claim 1, wherein the copolymer composition has a bulk weight average molecular weight greater than about 250 kg/mol.

3. The composition according to claim 1, wherein:
the first molecular weight fraction has a peak molecular weight ($M_p$) of less than about 300 kg/mol, the second molecular weight fraction has a peak molecular weight ($M_p$) of greater than about 1000 kg/mol, and the copolymer composition has a bulk weight average molecular weight greater than about 250 kg/mol and a level of unsaturation of greater than about 3.5 mol %.

4. The composition according to claim 1, wherein the multimodal molecular weight distribution comprises a bimodal molecular weight distribution.

5. The composition according to claim 1, wherein the copolymer composition has a phase angle of 60° or less when the copolymer composition has a complex modulus of 10,000 Pa or less.

6. The composition according to claim 1, wherein the copolymer has a gel content of less than 3.0 wt %.

7. The composition according to claim 1, wherein the copolymer composition has a zero shear viscosity compared to Mooney viscosity that is at least 1.5 times greater than zero shear viscosity compared to Mooney viscosity for a unimodal polyisoolefin-based copolymer composition having otherwise a same composition.

8. The composition according to claim 1, wherein the copolymer comprises isoolefin monomers having from 4 to 16 carbon atoms and at least 4 mol % of β-pinene or multi-olefin monomers having from 4-14 carbon atoms.

9. The composition according to claim 1, wherein the second molecular weight fraction comprises 3-15 wt % of the copolymer, based on total weight of the copolymer.

10. The composition according to claim 1, wherein the copolymer composition is free of a cross-linking agent and free of a branching agent and wherein the copolymer comprises inter-chain branching without a cross-linking agent and without a branching agent.

11. A process for producing a polyisoolefin-based copolymer composition, the process comprising: co-polymerizing 70-96 vol % isoolefin monomer and 4-30 vol % β-pinene or multi-olefin monomer, based on volume of isoolefin monomer and β-pinene or multi-olefin monomer, in a solution comprising 0-30 vol % aliphatic hydrocarbon diluent, based on volume of the solution, and an alkylaluminum halide initiator system to produce a polyisoolefin-based copolymer composition having a multimodal molecular weight distribution comprising a first molecular weight fraction having a peak molecular weight ($M_p$) of less than about 300 kg/mol and a second molecular weight fraction having a peak molecular weight ($M_p$) at least 3 times greater than the $M_p$ of the first molecular weight fraction, the copolymer composition having a level of unsaturation of greater than about 3.5 mol %.

12. A process for producing a polyisoolefin-based copolymer composition, the process comprising: co-polymerizing 70-96 vol % isoolefin monomer and 4-30 vol % β-pinene or multi-olefin monomer, based on volume of isoolefin monomer and β-pinene or multi-olefin monomer, in a solution comprising 0-30 vol % aliphatic hydrocarbon diluent, based on volume of the solution, and an alkylaluminum halide initiator system to produce a polyisoolefin-based copolymer composition having a multimodal molecular weight distribution comprising a first molecular weight fraction having a peak molecular weight ($M_p$) of less than about 300 kg/mol and a second molecular weight fraction having a peak molecular weight ($M_p$) of greater than about 1000 kg/mol, the copolymer composition having a weight average molecular weight ($M_w$) greater than about 250 kg/mol and a level of unsaturation of greater than about 3.5 mol %.

13. The process according to claim 11, wherein the diluent comprises hexane and is present in an amount of from 0.1-10 vol %.

14. The process according to claim 11, wherein the co-polymerization is performed at a temperature of −80° C. or greater.

15. The process according to claim 11, wherein, following polymerization, the copolymer is present in the diluent at a solids fraction of greater than 15%.

16. The process according to claim 12, wherein:
the diluent comprises hexane and is present in an amount of from 0.1-10 vol %;
the co-polymerization is performed at a temperature of −80° C. or greater; and
following polymerization, the copolymer is present in the diluent at a solids fraction of greater than 15%.

17. The composition according to claim 2, wherein:
the multimodal molecular weight distribution is a bimodal molecular weight distribution;
the bulk weight average molecular weight is greater than about 350 kg/mol;
the level of unsaturation is greater than about 4.5 mol %;
the copolymer composition has a phase angle of 60° or less when the copolymer composition has a complex modulus of 10,000 Pa or less;
the copolymer composition has a gel content of less than 3.0 wt %;
the copolymer composition has a zero shear viscosity compared to Mooney viscosity that is at least 1.5 times greater than zero shear viscosity compared to Mooney viscosity for a unimodal polyisoolefin-based copolymer composition having otherwise a same composition;
the copolymer comprises:
isoolefin monomers having from 4 to 7 carbon atoms selected from the group consisting of isobutene, 2-methyl-1-butene, 3-methyl-1-butene, 2-methyl-2-butene, 4-methyl-1-pentene and mixtures thereof; and
at least 4 mol % of β-pinene or multi-olefin monomers having from 4-14 carbon atoms selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof;
the copolymer comprises about 0-75 wt % of the second molecular weight fraction, based on total weight of the copolymer; and
the copolymer composition is free of a cross-linking agent and free of a branching agent and wherein the copolymer comprises inter-chain branching without a cross-linking agent and without a branching agent.

* * * * *